United States Patent [19]

Halpern et al.

[11] Patent Number: 4,596,189

[45] Date of Patent: Jun. 24, 1986

[54] LITHOGRAPHIC PRINTING PLATE

[75] Inventors: Gregory Halpern, Tarrytown; Herbert Herman, Port Jefferson; Daniel R. Marantz, Port Washington, all of N.Y.

[73] Assignee: Surface Science Corp., Yonkers, N.Y.

[21] Appl. No.: 584,985

[22] Filed: Mar. 1, 1984

[51] Int. Cl.$^4$ .......... B41N 3/00; B32B 5/16

[52] U.S. Cl. .......... 101/458; 101/463.1; 430/302

[58] Field of Search .......... 101/454, 458, 459, 463.1

[56] References Cited

U.S. PATENT DOCUMENTS

| | | | |
|---|---|---|---|
| 2,276,594 | 3/1942 | Rowell | 101/401.1 |
| 3,280,734 | 10/1966 | Fromson | 101/149.2 |
| 3,511,661 | 5/1970 | Rauner et al. | 96/86 |
| 3,546,415 | 12/1970 | Marantz | 219/76.14 |
| 3,586,614 | 6/1971 | Boggs | 101/459 |
| 3,679,418 | 7/1972 | Stroszynski | 101/454 |
| 3,720,164 | 3/1973 | Casson, Jr. | 101/463 |
| 4,082,040 | 4/1978 | Yamashina | 101/459 |
| 4,269,867 | 5/1981 | Altorfer | 219/76.14 |
| 4,302,483 | 11/1981 | Altorfer | 219/76.14 |
| 4,467,028 | 8/1984 | Huang | 101/459 |
| 4,480,549 | 11/1984 | Sakurai et al. | 101/456 |

FOREIGN PATENT DOCUMENTS

| | | | |
|---|---|---|---|
| 0052251 | 5/1978 | Japan | 101/459 |
| 0077599 | 6/1980 | Japan | 101/458 |
| 0063292 | 4/1982 | Japan | 101/458 |

*Primary Examiner*—Clyde I. Coughenour

*Attorney, Agent, or Firm*—David H. Semmes; Warren E. Olsen

[57] ABSTRACT

An improved lithographic printing plate which comprises (a) a substrate with (b) a substantially planar porous metal coating on at least one surface of the substrate and (c) a light-sensitive coating on the porous metal coating on the substrate. The substrate (a) can be made by a process for forming a substantially planar porous metal coating on a substrate which comprises thermal spraying of the metal on the substrate to form a porous metal coating on the substrate, rolling the sprayed coating to render it substantially planar and in the process close the pores, and the removing part of the surface to improve planarity and to reopen the surface-connected pores. The metal to be sprayed may be in the form of a wire, powder or molten metal mass and be selected from the group consisting of aluminum, zinc, tin, copper, nickel, or their alloys. Preferably, the substrate is selected from the gorup consisting of steel, aluminum, aluminized or galvanized steel, tin plate, and plastic. The spraying is preferably conducted in a non-oxidizing or reducing atmosphere. Preferably, the coating on the substrate is subjected to cold rolling. Most preferably, the rolling is conducted so as to reduce the coating thickness to approximately half of its original thickness. The substantially planar porous metal coated substrates are particularly desirable because of the "tooth" for the light-sensitive coating provided by the pores of the metal coating on the substrate. The novel lithographic printing plates may be either presensitized or "wipe-on" lithographic printing plates.

7 Claims, 3 Drawing Figures

LITHOGRAPHIC PRINTING PLATE

The invention is concerned with improved lithographic printing plates which have an improved porous substrate on which the light-sensitive coating is deposited. The improved porous substrate can be presensitized or may be used for "wipe-on" coating of the light-sensitive coating by the printer.

BACKGROUND OF THE INVENTION

In lithographic printing, presensitized printing plates are used which are comprised of an aluminum sheet, which has been mechanically grained on at least one surface, an interlayer, if required, on top of the grained surface, and a light-sensitive (usually diazo-based) coating on top of the interlayer. To expose and develop the plate for lithographic printing, one usually places a negative film of the desired image in contact with the light-sensitive coating on the plate, inside a vacuum frame; the frame is evacuated so that the negative is flattened against the glass by the plate and intimate contact is achieved; an ultraviolet light source is turned on to expose the plate through the clear areas of the negative; and the plate is removed from the frame and developed so that the non-exposed, non-image areas of the light-sensitive coating are dissolved from the plate by application of an appropriate solvent. The bare, grained aluminum plate attracts the aqueous fountain solution when the plate is mounted on the cylinder of an offset printing press, and the exposed and consequently insolubilized image areas of the light-sensitive coating repel the water. When the press is started, the plate on the cylinder rotates and the image area will attract the greasy ink and in turn transfer it to a rotating blanket (rubber sheet) on another cylinder, thereby offsetting the greasy ink image and the aqueous background onto the blanket, which in turn rotates against and prints on a sheet of paper moving through the press.

PRIOR ART

U.S. Pat. No. 2,106,368 describes a chemical graining process for preparing planographic printing plates from sheet aluminum, including a step which comprises reacting the aluminum with an alkali hydroxide in hot solution with an alkali aluminate, in order to free the surface of the aluminum from grease and to sensitize it to fatty acids. The result is stated to be an aluminum sheet both surfaces of which are grained with fine pits containing microporous oxide. In the process, there is a loss of aluminum from the surface of the treated sheet. The characteristics of the grained surfaces are described at page 4, lines 45 et seq. of the patent. The patent also describes the prior art process of mechanical graining, using gyrating marbles.

U.S. Pat. No. 2,276,594 describes a two-step process for graining a planographic printing plate substrate. The process comprises blasting one surface of the substrate with sharp granules, such as sand, flint or aluminum oxide, directed toward the surface at acute angles to it in order to raise minute projections of the surface material and then distorting the tops of the projections to cause them to overhang the surface.

U.S. Pat. No. 3,280,734 describes the anodizing of an aluminum substrate for printing plates, in which the anodic coating is stated to be porous. The anodizing process described in that patent results in a porous aluminum oxide coating in which the pores are especially less deep than those produced with the thermal spray process which is used to produce the porous metal coatings on the substrates of the printing plates of this invention. With the thermal spray process, the pores are all the way through the aluminum coating, for example; they are built from the bottom up, whereas pores made in the aluminum oxide coating by anodizing are generated from the surface down. As a practical matter, anodizing is self-limiting in its ability to generate pores because the aluminum oxide coating formed is an excellent dielectric and additional anodizing would require increasingly greater amounts of current as the oxide coating increased.

U.S. Pat. No. 3,511,661 is similar to U.S. Pat. No. 3,280,734, but stresses the formation of aluminum phosphate, which does not occur with the thermal spray process used to produce the substrates for the printing plates of this invention.

Anodizing may be thought of as resulting in a surface coating of pitted aluminum oxide, whereas thermal spray coating results in a kind of sponge-like coating of aluminum or whatever metal is chosen to be thermally sprayed on the chosen substrate.

SUMMARY OF THE INVENTION

The invention is concerned with an improved lithographic printing plate which comprises (a) a substrate with (b) a planographic porous metal coating on at least one surface of the substrate and (c) a light-sensitive coating on the porous metal coating on the substrate. The light-sensitive coating may be a diazo-based, diazo oxide-based, or photopolymer coating. If required, a protective interlayer coating may separate the porous metal coating on the substrate from the light-sensitive coating.

The improved substrate may be prepared in accordance with the invention disclosed in concurrently filed U.S. Patent Application Ser. No. 584,984 of Herbert Herman and Daniel Richard Marantz entitled "Process for Thermally Spraying Porous Metal Coatings on Substrates" issued as U.S. Pat. No. 4,526,839 on July 2, 1985 which is commonly assigned and upon which a terminal disclaimer has been entered in this application. That application describes a process for forming a substantially planar metal coating with controlled porosity on a substrate, which comprises thermal spraying of the metal on the substrate to form a porous metal coating on the substrate, rolling the sprayed coating to render it more planar and in the process seal a majority of the surface-connected pores, and then surface finishing the surface to improve planarity and to reopen a majority of the pores to the surface of the coating. The metal to be sprayed may be in any of a variety of forms, e.g., wire, powder or ingot, depending on the thermal spray process employed.

The metal to be sprayed may be selected from the group consisting of aluminum, zinc, tin, copper, nickel, and their alloys as well as ferrous alloys. Preferably, the substrate is selected from the group consisting of steel, aluminum, aluminized or galvanized steel, tin plate, paper and plastic. The spraying is preferably conducted in a non-oxidizing atmosphere, such as nitrogen, or in a reducing atmosphere, such as $NH_x$.

Preferably, the porous metal coating on the substrate is subjected to cold rolling. Most preferably, the rolling is conducted so as to reduce the porous metal coating thickness to approximately half of its original thickness.

The novel porous metal coated substrates are useful as planographic printing plate substrates because of their highly absorbent properties for certain fluids and chemicals, having the correct surface energy match to achieve wettability for the coating. "Tooth" for the coating is provided by the pores of the metal coating on the substrate. The planographic porous metal coated substrates are particularly suited as the base for either a presensitized or "wipe-on" lithographic printing plate.

To prepare the improved lithographic printing plates of this invention, it is preferred to use a steel sheet as the substrate, thermally spray it with aluminum, pressure roll the coating on the sheet to make the coating planographic, and then surface finish the coating. Several advantages are achieved in using the aluminum-coated steel as opposed to the ordinary aluminum sheet for the substrate of the printing plate. First, steel is stronger than aluminum and therefore has a longer running life on the press. It is less susceptible to stress cracking when bent. Steel is cheaper than aluminum. Thermal spraying of a microporous aluminum coating is in some respects a less polluting process than graining aluminum. Grained aluminum is more easily scratched than ungrained aluminum. Consequently, grained aluminum must be anodized to harden the grained surface. In contrast to the prior art graining, it appears that in the process of the invention as many as nine fewer process steps are required in processing the substrate for lithographic printing plates, with the consequent savings in capital equipment and related costs in a plant which produces such plates.

DESCRIPTION OF THE PREFERRED EMBODIMENTS

Figure 1:
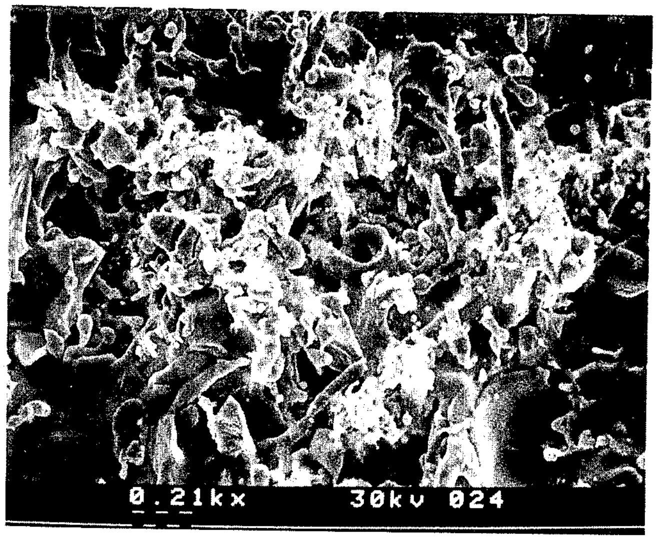
FIG. 1 is a 210× scanning electron micrograph of the top surface of an as-spray-coated porous aluminum coating on a steel substrate.

The metal to be sprayed onto the substrate is preferably selected from the group consisting of aluminum, zinc, tin, copper, nickel, and their alloys. Preferably, the substrate is selected from the group consisting of steel, aluminum, aluminized or galvanized steel, and plastic.

In general, the substrate material (e.g., steel) can be introduced into the preferred continuous coating process in the form of coils, typically 10 to 36 inches in width. The coil is fed into the system line from a conventional unwind mechanism. Preferred substrates range from about 0.006 to about 0.010 inches (about 150 to about 250 microns) in thickness.

Depending on the choice of substrate and its surface condition, it may be necessary or preferable to clean or precondition the substrate in order to increase the adhesion of the porous metal coating to the substrate. In some cases, steel, for example, is received from the mill with a thin film of protective oil on its surfaces. Of course, it would be desirable to preclean the steel substrate to remove the oil or to simultaneously clean and thermal spray coat the steel substrate. To achieve cleaning, to enhance adhesion bond strength and to improve deposition efficiency, it is desirable to preheat the substrate just prior to thermal spraying. The preheating can be achieved preferably by flame to obtain a chemical decomposition of any oil films on the surface of the substrate. The flame can be formed by combustion of gases. The temperature of the preheating of the steel substrate should preferably be at least about 500° F. The spraying is preferably conducted in the absence of corrosion promoting atmosphere, e.g., in a nitrogen atmosphere or in a reducing atmosphere, e.g., $NH_x$, in order to minimize possible corrosion of the substrate, which could interfere with the bonding of the porous coating to the substrate.

The thermal spray process for forming the porous metal coating on the surface of the substrate may utilize the flame, two-wire electric arc, or the molten metal electric arc method. For reasons of economy, the molten metal electric arc method is preferred.

In the flame spray method, the metal for the coating may be fed into the spray apparatus in the form of powder or wire.

The two-wire electric arc method of thermal spraying to produce the porous metal coating on the substrate is generally described in U.S. Pat. No. 3,546,415 of Daniel R. Marantz, entitled "Electric Arc Metallizing Device."

The molten metal arc method of thermal spraying to produce the porous metal coating on the substrate is generally described in U.S. Pat. Nos. 4,269,867 and 4,302,483 of Kenneth E. Altofer and Daniel R. Marantz, each entitled "Metallizing of a Corrodible Metal with a Protective Metal."

If the width of the substrate passing under the thermal spraying stage is too wide to be relatively uniformly coated with the coating by one spray device, then a series of spray devices can be utilized across the width of the substrate, arranged so that the spray patterns produced do result in a relatively uniform coating across the width of the substrate.

Typical electric-arc spray parameters are given in Table 1.

TABLE 1

Table of Electric-Arc Spray Parameters

| Condition | Useful Range | Preferred |
|---|---|---|
| Arc Current (D.C.) | 25 to 600 amps. | 75 amps. |
| Arc Voltage (D.C.) | 19 to 30 volts | 23 volts |
| Atomizing Gas | Air, nitrogen, $NH_x$ | Air |
| Atomizing Gas Pressure | 40 to 120 p.s.i. | 80 p.s.i. |
| Wire Diameter | 0.035 to 0.062 inches | 0.035 inches |
| Spray Distance | 2 to 12 inches | 9 inches |
| Spray Angle | 60 to 120 degrees | 90 degrees |
| Gun Traverse Rate | 2 to 50 surface-feet/minute | 10 surface-feet/minute |
| Surface Temperature | Room temperature to 900° F. | 550° F. |
| Coat Thickness | 0.001 to 0.010 inches | 0.003 inches |

To achieve the desired planographic surface of the porous metal coating on the substrate, the coating is rolled. Preferably, the coating on the substrate is subjected to cold rolling. Rolling increases the bond between the coating and substrate and also smooths the surface by closing the pores and insures greater planarity. Preferably, the process employs means for adjusting the rolling pressure. Most preferably, the rolling is conducted under sufficient pressure to reduce the coating thickness down to approximately half of its original as-deposited thickness or less. The root mean square (RMS) of the amplitude, or height, of the surface coating as-deposited can range from about 250 to about 350 microinches. After rolling, the RMS surface roughness can range from about 90 to about 150 microinches.

The next step in the process is to surface finish the rolled coating. This process, which may be multistaged, initially involves removing a minor amount of coated material, followed by a smoothing stage and subsequent final finishing stages. Surface finishing increases surface smoothness and reopens pores which have been closed by the rolling stage, giving increased surface porosity, which can be controlled for the intended application of the novel porous metal coated substrates in improved planographic printing plates of this invention. The various methods of surface finishing may employ abrasives in either wet or dry rubbing or brushing operations. After finishing, the RMS surface roughness achieved can range from about 10 to about 30 microinches. The degree of porosity of the coated, rolled and finished product of the process used in this invention is estimated at from about 8 to about 15 volume percent porosity. Additional surface modifications may be required and can be accomplished by further stages. Such further surface modification may be carried out as required by the specific intended application of the porous-metal coated plate. The finished product is then rewound by a conventional rewind mechanism.

Figure 2:
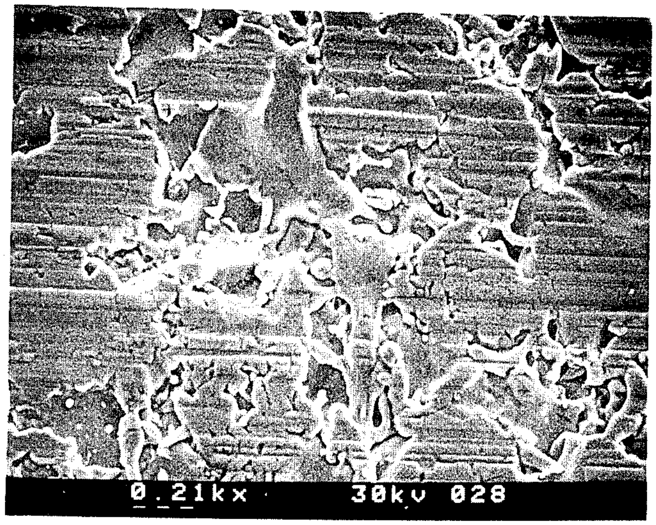
FIG. 2 is a 210× scanning electron micrograph of the top surface of the spray-coated porous aluminum coating shown in FIG. 1 after rolling.
Figure 3:
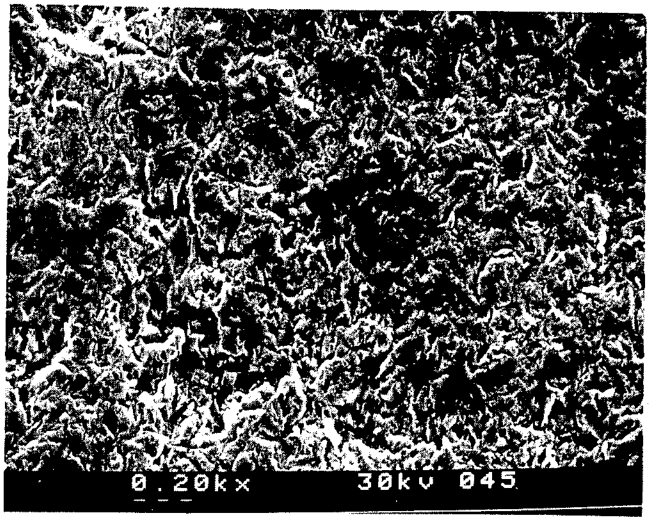
FIG. 3 is a 200× scanning electron micrograph of the top surface of the spray-coated porous aluminum coating shown in FIG. 1 after rolling and subsequent surface finishing in order to form the substantially planar surfaced substrate for the printing plates of this invention. Such coated substrates are used in the novel lithographic printing plates of this invention.

Detailed scanning electron microscope (SEM) examinations of the coated and treated surfaces are shown in FIGS. 1 to 3. FIG. 1 shows a 210× SEM top view of the as-spray-coated surface, indicating the high degree of roughness and numerous projections which formed during the process of solidification. FIG. 2 is a 210× SEM top view after the coating was rolled. FIG. 2 shows that after rolling the surface-connected porosity (i.e., that porosity open to the surface) is severely diminished, and the high points of the coating are flattened, showing overall compression of at least the topmost regions of the coatings. Rolling marks are apparent, which replicate the machinery marks of the rolls.

During the surface finishing stage, the very top of the coating surface was removed, revealing a very high degree of porosity comprised of extremely fine pores, as illustrated in the FIG. 3 SEM (200×). This porosity provides the metallic coating with an essential high absorption capability for coatings, making it wettable by a large class of liquid organic and inorganic compositions. It is this porosity which makes possible the improved utility of certain of the porous-metal coated substrates in this invention for specific application as a substrate for planographic printing plates.

To confirm that the porosity of the metal coatings is, in fact, maintained and is open to the outer surface following the finishing stage, an etched cross-section SEM of the coating-substrate was prepared. From the SEM, individual pores and pores which are connected directly to the surface were apparent. An SEM of an unetched cross-section also indicated the excellent quality of the interface between coating and substrate. It was apparent that the interface was well bonded and clean and essentially free of interfacial particles or major discontinuities, implying a strong and integral mechanical bond between coating and substrate.

The planographic porous metal coated substrates are particularly suited as the base for a "wipe-on" lithographic printing plate. As is known in the lithographic printing art, "wipe-on" lithographic printing plates are prepared by wiping onto a sheet of aluminum a coating of a light-sensitive composition, usually a diazo-based composition. The planographic coated substrates of the invention are exceptionally useful as the base for a presensitized lithographic printing plate. The porous metal coating on the substrate has "tooth" for the sensitized coating and is able to attract the aqueous fountain solution when the exposed and developed lithographic printing plate is used to print.

Any light-sensitive coating customarily used in making "wipe-on" or presensitized lithographic plates may be used as the light-sensitive coatings on the novel lithographic plates of the invention. Examples of such light-sensitive coatings are the diazo-based coatings, e.g., the condensation product of formaldehyde and diazo-p-aminodiphenylamine; the photopolymer compositions, e.g., those based on cross-linkable ethylenically unsaturated compounds; and diazo-oxide compositions. The diazo and photopolymer compositions are "negative-working," i.e., a photographic negative film is used to expose them, so that an exact positive image of the original art work or "mechanical" is produced. The diazo-oxide compositions are "positive-working," i.e., a photographic positive film is used to expose them and to produce a positive image on the plate. After exposure, the plates are developed with a developer composition, essentially comprised of a solvent for the non-image areas of the selectively exposed light-sensitive coating. The developer removes the non-image areas of the coating, thereby exposing the surface of the substrate.

If a diazo-based composition is used as the light-sensitive coating, a protective interlayer coating should be used between the porous metallic substrate of the lithographic plate and the diazo-based coating in order to prevent or inhibit decomposition of the diazo-based composition by the metallic substrate. A protective interlayer is not required for photopolymer coatings or diazo-oxide compositions.

Any of the known protective interlayer coating compositions can be used in effective amounts. Suitable interlayer coating compositions include water-soluble silicates, e.g., sodium silicate, and such compounds as potassium zirconium hexafluoride.

The silicate interlayer coating may be applied to the metallic substrate in a number of ways. For example, the metallic substrate may be immersed in the silicate solution, e.g., sodium silicate in concentration of less than about 1% to about 30% in aqueous solution, preferably from less than about 1% to about 5%. The concentration should not be so low as to be ineffective because of excessive dilution or so high as to be ineffective because of excessive viscosity. The silicate solution may be heated to a temperature in the range of about 120° F. to about 200° F., preferably from about 150° F. to about 180° F. The metallic substrate may be immersed for a period of time ranging from less than about 1 second to about 3 minutes, preferably from about 15 seconds to about 2 minutes. After immersion, the metallic substrate should be washed to remove excess alkali and then dried.

Potassium zirconium hexafluoride may be used to form the protective interlayer coating on the metallic substrate. It may be applied in a number of ways. For example, the metallic substrate may be immersed in an aqueous solution of potassium zirconium hexafluoride, which may be present in a concentration of from about 0.1% to about 0.5%. The temperature of the solution should be in the range of from about 100° F. to about 170° F. After immersion, the metallic substrate should be washed with water to remove excess solution and then dried.

Other known interlayers and light sensitive coatings may also be used, e.g., some of those mentioned in U.S. Pat. No. 3,511,661, particularly the combination mentioned in Example XI of that Patent, viz., a hydrophilic sublayer of poly[vinylbenzal-2,4-disulfonic acid] overcoated with the polycarbonate comprising the condensation product of 0.035 mole of 4,4'-dihydroxy chalcone, 0.03 mole bisphenol "A" and 0.035 mole of 2-(4-hydroxyphenylimino)-3-(4-hydroxyphenyl)-5-(4-azidobenzal)thizazolidine.

EXAMPLE 1

Aluminum wire was electric-arc sprayed according to the preferred parameters given in TABLE 1, onto properly prepared sheet steel approximately 0.007 inches (175 microns) in thickness. The arc-sprayed aluminum coating was approximately 0.003 inches (about 75 microns) thick and had a roughness on the order of 250 to 350 microinches RMS. The surface was rolled to close pores and to reduce high surface profile (i.e., to decrease apparent surface RMS roughness). After rolling, the roughness was approximately 120 microinches RMS. The coating was then finished, initially using 200 grit abrasive, followed by 600 grit, to remove the residual high points and to reopen pores. An RMS roughness level of about 10 to about 30 microinches can be achieved by this technique.

The novel porous aluminum coated steel substrate prepared as described above was used as the substrate for "wipe-on" lithographic plates. A silicate interlayer coating was applied to the metallic substrate by immersing it in an aqueous solution in which sodium silicate was present in concentration of about 2%. The silicate solution was heated to a temperature of about 180° F. The metallic substrate was immersed for a period of about one minute. After immersion, the metallic substrate was washed with water to remove excess alkali. After drying, the substrate coated with the silicate interlayer was coated with a commercially available "wipe-on" diazo composition. The plates so prepared were then exposed to ultraviolet light through a photographic negative, developed and used to print both text and half tones on a lithographic press with good results.

The novel porous substrate is also useful in preparing presensitized lithographic printing plates. When used as the base for presensitized lithographic printing plates, the novel porous aluminum coated steel substrates benefit from improved fatigue properties (above and beyond the mechanically grained and anodized all-aluminum sheet that is now generally employed as a base for lithographic printing plates), improved creep properties (as the term "creep" is used in the lithographic printing industry), and generally improved mechanical properties, such as fatigue life. Also, the surface-treated aluminum-coated steel, as discussed above, has a texture and controlled micro-porosity which enhance fountain solution carrying capacity as required in lithography. In addition, due to the rapid solidification which occurs during the spray deposition of the molten aluminum on the steel substrate, the aluminum coating is composed of ultrafine-grained material (one micron average diameter). This rapidly solidified material has greatly enhanced strength features, and this will enable longer-term use of such coated steels where significant mechanical wear occurs during such use.

EXAMPLE 2

When EXAMPLE 1 is repeated using aluminum sheet instead of steel as the substrate, there is produced a porous aluminum coated aluminum substrate suitable for use in making a planographic printing plate.

EXAMPLE 3

When EXAMPLE 1 is repeated using zinc wire instead of aluminum wire as the metal for forming the coating, there is produced a porous zinc coated steel substrate suitable for use in making a planographic printing plate.

EXAMPLE 4

An aluminum-coated steel sheet prepared as described above in Example 1 by the arc-sprayed application of aluminum is dipped into a 3% solution of Philadelphia Quartz's silicate E in water at a temperature of 175° F. After 30 seconds, the sheet is then rinsed with cold running water for one minute. The sheet is passed through squeeze rollers, and the excess water removed. The sheet is then dried with warm air.

The compound formed by the reaction of the condensation product of the diazo formed from para-aminodiphenylamine with formaldehyde and a substituted benzophenone (UVINUL MS40, a product of BASF Wyandotte), is then dissolved as a 2% solution in a mixture of 90% methyl Cellosolve and 10% water. To this is added 0.1% aqueous citric acid. This solution is poured on the plate, and the plate passed through a set of squeeze rollers. The plate is then dried with warm air. The result is a presensitized lithographic plate. After two weeks, this sheet is exposed in a standard high-pressure mercury lamplight exposure frame through a negative, which hardens the exposed area.

A one-step lithographic developer is applied to the plate, which removes the coating from the non-exposed area and coats a lacquer on the exposed image area. After rinsing, the plate is mounted on a lithographic press and several thousand good copies are printed.

EXAMPLE 5

A steel sheet which has the aluminum surface described in Example 1 is immersed for one minute in a 0.5% solution of potassium hexafluoride at 150° F. It is then immersed in a 0.01% solution of potassium zirconium hexafluoride in water at 140° F. for one minute. The plate is then rinsed with cold water, passed through squeeze rollers, and dried.

A solution is made consisting of 50% methyl Cellosolve, 40% ethylene dichloride, 8% dimethyl formamide, 1% epoxy resin (EPON 1004 from Shell Chemical Corp.), 0.5% polyvinyl formal, and 0.5% of the reaction product of the condensation product of the diazo from para-amino diphenylamine and formaldehyde and a substituted benzophenone (UVINUL MS40 from BASF Wyandotte). This is applied to the sheet by a meniscus coater (dip coater). The coated sheet is dried in warm air.

After two weeks, the presensitized plate is exposed through a negative. The non-image unhardened area is removed with POLYCHROME's negative plate aqueous developer. The excess developer is rinsed off, and the plate mounted on a lithographic press. Thousands of good copies are obtained.

What is claimed is:

1. An improved lithographic printing plate which results as a product by the process which comprises:

a. a substantially planar metal substrate;

b. a coating of thermal sprayed porous metal on the substrate, wherein said coating first is sprayed, then rolled so as to render said spray coating substantially planar and then part of the surface of said spray coating is removed to improve planarity and to reopen some of the pores of said spray coating; and c. a light sensitive coating is applied to the porous metal coating on the substrate.

2. An improved lithographic printing plate as claimed in claim 1 resulting from the further steps of a substantially planar porous metal coated substrate in which the thermal spray coating on the substrate then is subjected to cold rolling.

3. An improved lithographic printing plate as claimed in claim 1 resulting from the further steps of a substantially planar porous metal coated substrate in which the thermal spray coating is rolled so as to reduce the metal coating thickness down to approximately half of its as-sprayed thickness.

4. An improved lithographic printing plate as claimed in claim 1 resulting from the further steps of a substantially planar porous metal coated substrate in which the thermal spray coating is rolled to define a surface with a roughness root mean square height of from about 10 to about 30 microinches.

5. An improved lithographic printing plate as claimed in claim 1 resulting from the further steps of a substantially planar porous metal coated substrate in which the thermal spray coating is rolled to create a porosity of from about 8 to about 15 volume percent.

6. An improved lithographic printing plate as claimed in claim 1 resulting from the further steps of a substantially planar porous metal coated substrate in which the metal thermal spray coating is selected from the group consisting of aluminum, zinc, tin, copper, nickel, and their alloys.

7. An improved lithographic printing plate as claimed in claim 1 resulting from the further steps of a substantially planar porous metal coated substrate in which the metal substrate is selected from the group consisting of steel, aluminum, aluminized steel, galvanized steel, plastic and paper.

* * * * *